US012803008B2

(12) United States Patent
Ljungcrantz

(10) Patent No.: US 12,803,008 B2
(45) Date of Patent: Nov. 17, 2026

(54) PRODUCTION METHOD AND PRODUCTION LINE FOR PRODUCING A FLOW FIELD FUEL-CELL PLATE

(71) Applicant: Interplex NAS Electronics GmbH, Heilbronn (DE)

(72) Inventor: Henrik Ljungcrantz, Linköping (DE)

(73) Assignee: Interplex NAS Electronics GmbH, Heilbronn (DE)

( * ) Notice: Subject to any disclaimer, the term of this patent is extended or adjusted under 35 U.S.C. 154(b) by 905 days.

(21) Appl. No.: 18/026,425

(22) PCT Filed: May 4, 2021

(86) PCT No.: PCT/EP2021/061676

§ 371 (c)(1),
(2) Date: Mar. 15, 2023

(87) PCT Pub. No.: WO2022/058055

PCT Pub. Date: Mar. 24, 2022

(65) Prior Publication Data

US 2024/0030464 A1 Jan. 25, 2024

(30) Foreign Application Priority Data

Sep. 16, 2020 (DE) ..................... 10 2020 124 087.2

(51) Int. Cl.
*H01M 8/0206* (2016.01)
*H01M 8/0228* (2016.01)
(Continued)

(52) U.S. Cl.
CPC ....... *H01M 8/0206* (2013.01); *H01M 8/0228* (2013.01); *H01M 8/0271* (2013.01); *H01M 8/0297* (2013.01)

(58) Field of Classification Search
CPC ............. H01M 8/0206; H01M 8/0228; H01M 8/0271; H01M 8/0297; H01M 8/0202;
(Continued)

(56) References Cited

U.S. PATENT DOCUMENTS

2003/0157391 A1* 8/2003 Coleman ............. H01M 8/0245 429/467
2010/0112403 A1 5/2010 Berggren et al.
(Continued)

FOREIGN PATENT DOCUMENTS

DE 102010054617 A1 6/2012
DE 102016125502 A1 6/2018
(Continued)

OTHER PUBLICATIONS

International Search Report and Written Opinion dated Jun. 30, 2021, which issued in the corresponding PCT Patent Application No. PCT/EP2021/061676.
(Continued)

*Primary Examiner* — Matthew W Van Oudenaren
(74) *Attorney, Agent, or Firm* — Dickinson Wright PLLC

(57) ABSTRACT

The invention relates to a production line (1) for producing a flow field fuel-cell plate (100) and to a method for producing a flow field fuel-cell plate (100) from a continuous or discontinuous metal strip (10) by means of the production line (1), which comprises a conveying device (2), a stamping device (3), a cleaning device (4), a coating device (5), a welding device (6), and an injection-molding machine (7). The production method initially comprises stamping the metal strip (10) by means of the stamping device (3) and thus forming metal plates (11) on the metal strip (10), subsequently cleaning the metal plates (11) by means of the cleaning device (4), thereupon coating the metal plates (11) by means of the coating device (5), thereafter welding the metal plates (11) by means of the welding device (6), two metal plates (11) being joined to each other such that they each form a flow field fuel-cell plate (100) having a cathodic side and an anodic side; and finally overmolding each flow field fuel-cell plate (100) by means of the injection-molding machine (7), wherein the conveying device (2) is designed
(Continued)

to convey the metal strip (10) within the production line (1), and wherein the metal strip (10), the metal plates (11) and the flow field fuel-cell plates (100) are disposed on the conveying device (2) during the entire production method and are conveyed, in particular continuously, by the conveying device (2).

17 Claims, 1 Drawing Sheet

(51) Int. Cl.
*H01M 8/0271* (2016.01)
*H01M 8/0297* (2016.01)

(58) Field of Classification Search
CPC .. H01M 8/0204; H01M 8/0208; H01M 8/021; H01M 8/023; H01M 8/0232; H01M 8/0245; H01M 8/0254; H01M 8/0258; H01M 8/026; H01M 8/0263; H01M 8/0265; H01M 8/0286; H01M 8/0273
See application file for complete search history.

(56) References Cited

U.S. PATENT DOCUMENTS

2015/0180053 A1* 6/2015 Jin .......................... B29C 65/48 156/245
2021/0135245 A1* 5/2021 Cisar .................... B21D 43/055

FOREIGN PATENT DOCUMENTS

DE 102019202493 A1 8/2020
WO WO2018114974 * 6/2018

OTHER PUBLICATIONS

German Examination Report dated Jan. 13, 2022, which issued in the corresponding German Patent Application No. 10 2020 124 087.2.
Tawfik et al: "Metal bipolar plates for PEM fuel cell—A review", Journal of Power Sources, Elsevier SA, CH, Bd. 163, Nr. 2, Dec. 22, 2006 (Dec. 22, 2006), pp. 755-767, XP005812532.
Mehta Vet al: "Review and analysis of PEM fuel cell design and manufacturing", Journal of Power Sources, Elsevier SA, CH, Bd. 114, Nr. 1, Feb. 25, 2003 (Feb. 25, 2003), pp. 32-53, XP004412816.

* cited by examiner

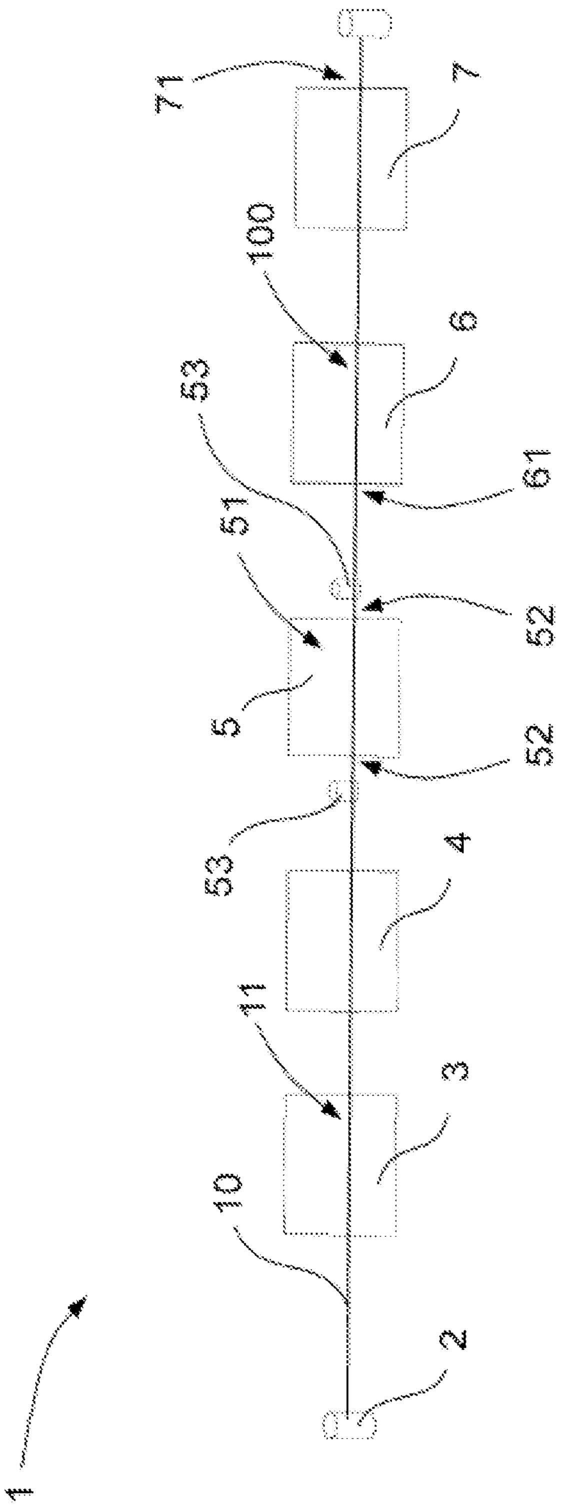
71
7
100
6
53
61
51
52
5
52
53
4
11
3
10
2
1

PRODUCTION METHOD AND PRODUCTION LINE FOR PRODUCING A FLOW FIELD FUEL-CELL PLATE

The invention relates to a production line for producing a flow field fuel-cell plate and to a method for producing a flow field fuel-cell plate from a continuous or discontinuous metal strip with the production line which comprises a conveying device, a stamping device, a cleaning device, a coating device, a welding device and an injection-molding machine.

In the production of a flow field fuel-cell plate, a production line typically uses a storage, a loading station, and an unloading station for each production step to move the components to be processed from one production device to a next production device in the production line. For this reason, each production step slows down the production of the flow field fuel-cell plate, even with an automated production line. Furthermore, loading, storing and unloading increases the risk of an increased reject rate.

It is therefore an object of the present invention to provide a production line for producing a flow field fuel-cell plate and a method for producing a flow field fuel-cell plate in which productivity and lead time are increased and production rejects and production cost are reduced.

This object is achieved by the combination of features according to claim 1.

Proposed according to the invention is a method for producing a flow field fuel-cell plate from a continuous or discontinuous metal strip with a production line which comprises a conveying device, a stamping device, a cleaning device, a coating device, a welding device, and an injection-molding machine. The production method initially comprises stamping the metal strip by means of the stamping device. In doing so, metal plates are formed on the metal strip. Subsequently, cleaning of the metal plates is carried out by means of the cleaning device, and thereafter, coating of the metal plates is carried out by means of the coating device. Thereafter, welding of the metal plates is carried out by means of the welding device. Two metal plates are joined together in such a manner that they form in each case a flow field fuel-cell plate having a cathodic and an anodic side. Finally, the respective flow field fuel-cell plate is overmolded by means of the injection-molding machine. The conveying device is designed to convey the metal strip within the production line, and the metal strip, the metal plates and the flow field fuel-cell plates are disposed on the conveying device during the entire production method and are conveyed in particular continuously by the conveying device. The advantage of this is that in the production method with the corresponding production line, the metal strip, the metal plates and the flow field fuel-cell plates are disposed at the conveying device during the entire production method, thereby increasing the productivity and the lead time and reducing the production rejects and the production costs.

In an advantageous embodiment variant, it is provided that during stamping of the metal strip, the metal plates are formed in such a manner that, in the strip conveying direction, an anode and a cathode are alternately formed as a metal plate on the metal strip. In an alternative embodiment of the production process, it is provided that during stamping of the metal strip, the metal plates are formed in such a manner that, in the strip conveying direction, in each case one anode and one cathode are formed parallel to one another as a metal plate on the metal strip. In this manner, the metal plates are prepared for welding in each case one anode to one cathode.

Preferably, the metal strip comprises at least one pilot strip which is provided in each case on one or both longitudinal sides of the metal strip, and the conveying device conveys the metal strip by means of the pilot strip. The pilot strip simplifies conveying of the metal strip by means of the conveying device.

In another embodiment of the present production method, it is provided that during stamping, the metal strip is progressively stamped by means of the stamping device. As a result, automating the production method is improved.

In another advantageous variant, it is provided according to the invention that the metal strip is unwound from a coil before stamping and is wound onto a coil after overmolding. Preferably, the plates are stamped in a vertical direction to the strip conveying direction to allow the metal strip to be wound and unwound in order to deal with variations in the production speed of the various machines in the production line. The metal strip can be handled in either the vertical or horizontal direction. Preferred is the vertical direction with less pressure on the coil when the strip needs to be wound.

In an advantageous exemplary embodiment of the production method, the cleaning device is designed to generate an ultrasound for cleaning when cleaning the metal plates. In this manner, a thorough, environmentally friendly and furthermore economical cleaning process is provided.

In another advantageous embodiment of the production method, the cleaning device is designed to brush the metal plates during cleaning of the metal plates. For this purpose, a cleaning agent is used which is an alcohol, alkaline water-based or solvent-based. Thus, a technically simple cleaning device is used, which has a low susceptibility to errors.

Furthermore, favorable is an embodiment in which coating of the metal plates is carried out by means of physical vapor deposition (PVD). In this case, the coating device has a vacuum system and in each case a load lock system for handling an entry and an exit of the metal plates into/from the vacuum system. The physical vapor deposition is particularly suitable for automatic coating of the metal plates. The load lock system allows the profiled metal strip to be handled as it enters and exits the vacuum coating system or vacuum chamber. For maintaining the vacuum, the load lock system preferably has an appropriately designed seal that continuously adapts to the outer contour of the metal strip or metal plates. For this purpose, the seal is made, for example, of an elastic material which is attached to the lock in such a manner that during the transport of the metal strip, the sealing material elastically adapts in each case to the contour of the metal strip currently located in the area of the sealing plane.

Another advantageous embodiment of the seal comprises at least two or more individual seals which are disposed sequentially one behind the other in the conveying direction of the metal strip and are each moved along with the metal strip in a sealing state in the direction of transport for a predetermined distance, one of the seals in each case advantageously remaining in its position. To maintain the vacuum, at least one of the individual seals is continuously disposed in a sealing manner on the metal strip and the at least one further individual seal is meanwhile moved into an initial position of the predetermined distance so that the at least one further individual seal can be disposed in a sealing manner on the metal strip before the currently sealing individual seal is opened at an end position of the predetermined distance. Also conceivable are other sealing methods in which in each case one portion on the sealing strip is formed as a sealing area and the strip has a multiplicity of these sealing portions in the transport direction in order to seal thereon with a fixed or movable sealing means.

In another advantageous embodiment, it is provided that coating the metal plates with the coating device is performed by plasma spraying, atmospheric chemical vapor deposition, vacuum chemical vapor deposition, plating or printing.

In a preferred embodiment of the production method, the coating device has in each case at least one flexibly disposed roller at an inlet and an outlet of the coating device. In this case, the metal strip and in particular the metal plates are tensioned by means of the respective roller. As a result, entering and exiting of the coated metal strip takes place via the flexible rollers and the space between the roller and the formed metal strip can be narrowed or adapted to the metal strip and the strip conveying speed.

In one embodiment variant, the method according to the invention is carried out in such a manner that during the welding of the metal plates by means of the welding device, in each case an anode and a cathode are each welded together, preferably welded together by laser welding, and form a flow field fuel-cell plate. Furthermore, the welding device has a clamping device and the two metal plates are joined together before welding by means of the clamping device. Preferably, the welding is monitored by a visual camera.

Furthermore it is advantageous if the metal strip is fitted in the injection-molding machine in such a manner that continuous overmolding is possible. In a preferred embodiment of the method, the injection molding machine is designed to carry out a multiplicity of steps of overmolding in parallel, which are carried out in parallel during the overmolding of the respective fuel-cell plate in accordance with a strip conveying speed of the metal strip. The advantage of this is that the overmolding with the injection-molding machine can be carried out in the production line in an automated manner at the strip conveying speed, although the overmolding can usually only be carried out at a speed slower than the strip conveying speed.

In an advantageous variant, it is provided according to the invention that after the overmolding of the flow field fuel-cell plate, an inspection of the flow field fuel-cell plate is carried out by means of a visual camera and geometric features of the flow field fuel-cell plate are predetermined for the inspection. In this manner, defective flow field fuel-cell plates are detected at the end of the production method.

Furthermore, an embodiment variant is favorable in which the flow field fuel-cell plate is marked by means of a laser after inspecting when the predetermined geometric features have been detected by means of the further camera. As a result, for further processing of the flow field fuel-cell plate, it can be easily detected that a correctly produced flow field fuel-cell plate is present.

Furthermore, proposed according to the invention is a production line for producing of a flow field fuel-cell plate from a continuous or discontinuous metal strip. The production line comprises a single conveying device disposed along the production line, a stamping device, a cleaning device, a coating device, a welding device and an injection-molding machine. Here, the conveying device is disposed or extends from the stamping device along the cleaning device, the coating device, the welding device up to the injection-molding machine. Thus, a production line for producing a flow field fuel-cell plate is provided in which productivity and lead time are increased and production rejects and production costs are reduced.

Other advantageous refinements of the invention are characterized in the subclaims or are illustrated in more detail below together with the description of the preferred embodiment of the invention with reference to the figures.

In the figures:

FIG. 1 shows a schematic illustration of a production line for producing a flow field fuel-cell plate from a continuous or discontinuous metal strip.

FIG. 1 shows a schematic illustration of a production line 1 for producing a flow field fuel-cell plate 100 from a continuous metal strip 10. The production line 1 comprises a single conveying device 2 disposed along the production line 1, a stamping device 3, a cleaning device 4, a coating device 5, a welding device 6 and an injection-molding machine 7. Here, the conveying device 2 extends from the stamping device 3 along the cleaning device 4, the coating device 5, the welding device 6 up to the injection-molding machine 7.

The conveying device 2 is designed to convey the metal strip 10 within the production line 1. In doing so, the metal strip 10, the metal plates 11 and the flow field fuel-cell plates 100 are disposed on the conveying device 2 during the entire production method and can be conveyed, in particular continuously, by the conveying device 2.

The metal strip 10 comprises at least one pilot strip which is provided in each case on a longitudinal side of the metal strip 10 and by means of which the conveying device 2 conveys the metal strip 10. Furthermore, the metal strip 10 is wound on a coil before stamping and after overmolding.

The stamping device is configured to progressively stamp the metal strip 10 in such a manner that metal plates 11 can be produced on the metal strip 10. Furthermore, during stamping of the metal strip 10, the metal plates 11 can be formed such that, in the strip conveying direction, an anode and a cathode are alternately formed as a metal plate 11 on the metal strip 10.

Furthermore, the cleaning device 4 is designed to generate an ultrasound for cleaning when cleaning the metal plates 11.

The coating device 5 is designed for coating the metal plates 11 by means of physical vapor deposition. In addition, the coating device 5 has a vacuum system 51 and in each case a load lock system 52 for the handling of entry and exit of the metal plates 11 into/from the vacuum system 51. Furthermore, the coating device 5 has a flexibly disposed roller 53 at an inlet and an outlet of the coating device 5, respectively, for tensioning the metal strip 10 and in particular the metal plates 11 by means of the respective roller 53.

Moreover, the welding device 6 is designed for welding the metal plates 11 by laser welding in such a manner that two metal plates 11, namely an anode and a cathode in each case, can be welded together and a flow field fuel-cell plate 100 can be formed. In addition, the welding device 6 has a clamping device 61 for joining the two metal plates 11 before welding.

The injection-molding machine is designed for overmolding the respective flow field fuel-cell plate 100. In doing so, the metal strip 10 is fitted in the injection-molding machine 7 in such a manner that continuous overmolding is possible. Furthermore, the injection-molding machine 7 is designed to carry out a multiplicity of overmolding steps in parallel, which can be carried out in parallel during overmolding of the respective flow field fuel-cell plate 100, according to a strip conveying speed of the metal strip 10.

Moreover, the production line has a visual camera for inspecting the flow field fuel-cell plate 100 after overmolding the flow field fuel-cell plate 100. Geometric features of the flow field fuel-cell plate 100 are predetermined for inspecting. Furthermore, a laser is disposed for marking a flow field fuel-cell plate 100 after inspecting, provided that the predetermined geometric features have been detected by means of the further camera 71.

The invention claimed is:

1. A method for producing a flow field fuel-cell plate (100) from a continuous or discontinuous metal strip (10) with a production line (1) which comprises a conveying device (2), a stamping device (3), a cleaning device (4), a coating device (5), a welding device (6) and an injection-molding machine (7), comprising the steps of:

a. stamping the metal strip (10) by means of the stamping device (3) thereby forming metal plates (11) on the metal strip (10), b. cleaning the metal plates (11) by means of the cleaning device (4), c. coating the metal plates (11) by means of the coating device (5), d. welding the metal plates (11) by means of the welding device (6), (6) thereby forming two metal plates (11) being joined to one another in such a manner that they form in each case a flow field fuel-cell plate (100) having a cathodic and an anodic side, and e. overmolding the flow field fuel-cell plate (100) by means of the injection-molding machine (7), wherein the conveying device (2) is designed to convey the metal strip (10) within the production line (1), and wherein the metal strip (10), the metal plates (11) and the flow field fuel-cell plate (100) are disposed on the conveying device (2) throughout production and are conveyed continuously by the conveying device (2).

2. A method according to claim 1, wherein, during stamping of the metal strip (10), the metal plates (11) are formed in such a manner that, in a strip conveying direction, in each case one anode and one cathode are alternately formed as a metal plate (11) on the metal strip (10).

3. A method according to claim 1, wherein, during stamping of the metal strip (10), the metal plates (11) are formed in such a manner that, in a strip conveying direction, in each case one anode and one cathode are formed parallel to one another as a metal plate (11) on the metal strip (10).

4. A method according to claim 1, wherein the metal strip (10) comprises at least one pilot strip which is provided in each case on one or on both longitudinal sides of the metal strip (10), wherein the conveying device (2) conveys the metal strip (10) by means of the pilot strip.

5. A method according to claim 1, wherein during stamping, the metal strip (10) is progressively stamped by means of the stamping device (3).

6. A method according to claim 1, wherein the metal strip (10) is unwound from a coil before stamping and is wound onto a coil after overmolding.

7. A method according to claim 1, wherein the cleaning device (4) is designed to generate an ultrasound for cleaning when cleaning the metal plates (11).

8. A method according to claim 1, wherein the cleaning device (4) is designed to brush the metal plates (11) when cleaning the metal plates (11), wherein a cleaning agent is used which is an alcohol, alkaline water-based or solvent-based.

9. A method according to claim 1, wherein coating of the metal plates (11) is carried out by physical vapor deposition, wherein the coating device (5) has a vacuum system (51) and a load lock system (52) for respective handling of entry and exit of the metal plates (11) into/from the vacuum system (51).

10. A method according to claim 1, wherein coating of the metal plates (11) with the coating device (5) is carried out by plasma spraying, atmospheric chemical vapor deposition, vacuum chemical vapor deposition, plating or printing.

11. A method according to claim 1, wherein the coating device (5) comprises at least one flexibly disposed roller (53) at an inlet and an outlet of the coating device (5), respectively, wherein the metal strip (10) and the metal plates (11) are tensioned by means of the roller (53).

12. A method according to claim 2, wherein during welding of the metal plates (11) by means of the welding device (6), in each case one anode and one cathode are welded together, welded by laser welding, and form a flow field fuel-cell plate (100), wherein the welding device (6) comprises a clamping device (61) and the metal plates (11) are joined together by means of the clamping device (61) before welding.

13. A method according to claim 1, wherein the metal strip (10) is fitted in the injection-molding machine (7) in such a manner that continuous overmolding is possible.

14. A method according claim 1, wherein the injection-molding machine (7) is designed to carry out a multiplicity of steps of overmolding in parallel, which are performed in parallel when overmolding the flow field fuel-cell plate (100), according to a strip conveying speed of the metal strip (10).

15. A method according to claim 1, wherein after the overmolding of the flow field fuel-cell plate (100), an inspection of the flow field fuel-cell plate (100) is carried out by means of a visual camera (71), wherein geometrical features of the flow field fuel-cell plate (100) are predetermined for the inspection.

16. A method according to claim 15, wherein after inspecting, the flow field fuel-cell plate (100) is marked by means of a laser when the predetermined geometrical features have been detected by means of the camera (71).

17. A production line (1) for producing a flow field fuel-cell plate (100) from a continuous or discontinuous metal strip (10), comprising a single conveying device (2) disposed along the production line, a stamping device (3), a cleaning device (4) a coating device (5), a welding device (6) and an injection-molding machine (7), wherein the conveying device (2) is disposed or extends from the stamping device (3) along the cleaning device (4), the coating device (5), the welding device (6) up to the injection-molding machine (7).

* * * * *